United States Patent
Iiu et al.

(10) Patent No.: US 11,106,924 B2
(45) Date of Patent: Aug. 31, 2021

(54) VEHICLE TRACKING METHOD, COMPUTER READABLE STORAGE MEDIUM, AND ELECTRONIC DEVICE

(71) Applicant: NEUSOFT CORPORATION, Shenyang (CN)

(72) Inventors: Yuan Iiu, Shenyang (CN); Michael Zhang, Shenyang (CN); Menghui Yang, Shenyang (CN)

(73) Assignee: NEUSOFT CORPORATION, Shenyang (CN)

(*) Notice: Subject to any disclaimer, the term of this patent is extended or adjusted under 35 U.S.C. 154(b) by 114 days.

(21) Appl. No.: 16/564,481

(22) Filed: Sep. 9, 2019

(65) Prior Publication Data

US 2020/0364472 A1   Nov. 19, 2020

(30) Foreign Application Priority Data

May 14, 2019   (CN) .......................... 201910399277.9

(51) Int. Cl.
*G06K 9/00* (2006.01)
*G01S 19/42* (2010.01)
(Continued)

(52) U.S. Cl.
CPC ............ *G06K 9/00805* (2013.01); *G06K 9/40* (2013.01); *H04W 4/46* (2018.02); *G06K 2209/21* (2013.01); *G06K 2209/23* (2013.01)

(58) Field of Classification Search
USPC ........................................................ 382/103
See application file for complete search history.

(56) References Cited

U.S. PATENT DOCUMENTS 8,255,081 B2   8/2012 Lee et al.
9,696,404 B1*  7/2017 Doyle ................ H04N 5/23261
(Continued)

FOREIGN PATENT DOCUMENTS

CN   104978570 A   10/2015
CN   105549049 A   5/2016
(Continued)

OTHER PUBLICATIONS

Trong-Hop Do et al., Visible light Communication Based Vehicle to Vehicle Tracking Using CMOS Camera, Jan. 1, 2019, IEEE, 2169-3536, vol. 7, pp. 7218-7227. (Year: 2019).*
(Continued)

*Primary Examiner* — Ishrat I Sherali
(74) *Attorney, Agent, or Firm* — Myers Wolin, LLC

(57) ABSTRACT

The present disclosure relates to a vehicle tracking method, a computer readable storage medium, and an electronic device. The method includes: determining a predicted value of state information of a target tracking vehicle based on a sequential Kalman filtering model according to a most recently acquired tracking value of the state information of the target tracking vehicle, wherein the state information at least includes location information; obtaining a detected value of the state information of the target tracking vehicle; and in response to the obtained detected value, acquiring a new tracking value of the state information of the target tracking vehicle based on the sequential Kalman filtering model according to the detected value and the most recently determined predicted value. Through the above technical solution, the tracking value of the state information of the target tracking vehicle may be determined more accurately.

12 Claims, 2 Drawing Sheets

(51) Int. Cl.
*H04W 4/46* (2018.01)
*G06K 9/40* (2006.01)

(56) References Cited

U.S. PATENT DOCUMENTS

| | | | | |
|---|---|---|---|---|
| 10,054,446 B2* | 8/2018 | Cordova | ............... | H04W 4/027 |
| 2002/0171586 A1* | 11/2002 | Martorana | ............ | G01S 5/0294 |
| | | | | 342/458 |
| 2006/0220954 A1* | 10/2006 | Hunt | ........................ | G01S 1/06 |
| | | | | 342/357.31 |
| 2008/0120031 A1* | 5/2008 | Rosenfeld | ................ | H01Q 3/10 |
| | | | | 701/500 |
| 2010/0017115 A1* | 1/2010 | Gautama | ................ | G01C 15/00 |
| | | | | 701/533 |
| 2010/0315290 A1* | 12/2010 | Grabbe | ................ | G01S 5/0205 |
| | | | | 342/386 |
| 2014/0088790 A1* | 3/2014 | Vukman | ................... | G06F 7/00 |
| | | | | 701/1 |
| 2014/0281779 A1* | 9/2014 | Wellman | ............... | G01S 13/003 |
| | | | | 714/746 |
| 2015/0153460 A1* | 6/2015 | Fleming | ................ | G01C 21/00 |
| | | | | 702/150 |
| 2017/0254893 A1* | 9/2017 | Evans | ................... | G01S 13/726 |
| 2019/0318041 A1* | 10/2019 | Bai | ....................... | G06K 9/6278 |
| 2020/0003861 A1* | 1/2020 | Eriksson | ............. | B60R 21/0134 |
| 2020/0216076 A1* | 7/2020 | Otto | ..................... | G05D 1/0276 |

FOREIGN PATENT DOCUMENTS

| | | |
|---|---|---|
| CN | 105809126 A | 7/2016 |
| CN | 107463907 A | 12/2017 |

OTHER PUBLICATIONS

Zhu, "DSRC and Sensor Fusion Based Target Tracking Method for Intelligent Vehicle Sensor Fusion", Chinese Master's Theses Full-text Database, Engineering Science and Technology II, CNKI.net, pp. 35-338, Mar. 2017, with an English translation.

Ma et al., "Fundamentals of Fire Control Technology", Beijing Institute of Technology Press, pp. 85-86, Aug. 2018, with an English translation.

* cited by examiner

VEHICLE TRACKING METHOD, COMPUTER READABLE STORAGE MEDIUM, AND ELECTRONIC DEVICE

CROSS REFERENCE TO RELATED APPLICATIONS

The present application claims the benefit of Chinese patent application No. 201910399277.9 filed on May 14, 2019. The entire contents of the above-cited application are hereby incorporated by reference in their entirety for all purposes.

TECHNICAL FIELD

The present disclosure relates to vehicle monitoring field, and in particular to a vehicle tracking method, a computer readable storage medium, and an electronic device.

BACKGROUND

Vehicle tracking is one of the most important data fusion tasks of an Advanced Driving Assistant System (ADAS) and autonomous vehicles. The ADAS may be applied to Collision Avoidance/Collision Mitigation (CA/CM), Adaptive Cruise Control (ACC), stop-boost or blind spot detection and other aspects, and its applications need to reliably estimate the location information of other vehicles.

In the prior art, a vehicle is usually tracked and positioned based on information collected by a sensor. However, when the positioning is performed via the information collected by the sensor, the synchronism of the collected information needs to be ensured, but asynchronous transmission of collected synchronization signals may be caused by network bandwidth occupation and other reasons. In the case of slow data transmission and data loss, a phenomenon of serious data tracking delay and even tracking failure will occur, and the vehicle tracking efficiency is relatively low.

SUMMARY

An objective of the present disclosure is to provide a vehicle tracking method, a computer readable storage medium, and an electronic device with high efficiency and high accuracy.

In order to achieve the above objective, according to a first aspect of the present disclosure, a vehicle tracking method is provided, including:
determining a predicted value of state information of a target tracking vehicle based on a sequential Kalman filtering model according to a most recently acquired tracking value of the state information of the target tracking vehicle, wherein the state information at least includes location information;
obtaining a detected value of the state information of the target tracking vehicle; and in response to the obtained detected value, acquiring a new tracking value of the state information of the target tracking vehicle based on the sequential Kalman filtering model according to the detected value and the most recently determined predicted value.

According to a second aspect of the present disclosure, a computer readable storage medium is provided, a computer program is stored thereon, the program implements the steps of the method of the first aspect described above when being executed by a processor.

According to a third aspect of the present disclosure, an electronic device is provided, including:
a memory, wherein a computer program is stored thereon; and
a processor, configured to execute the computer program in the memory to implement the steps of the method of the first aspect described above.

In the above technical solution, on the basis of the most recently acquired tracking value of the state information of the target tracking vehicle, while the detected value of the state information of the target tracking vehicle is acquired, the predicted value and the detected value of the state information of the target tracking vehicle are fused based on the sequential Kalman filtering model, so as to determine the new tracking value of the target tracking vehicle. Therefore, through the above technical solution, on one hand, the tracking value of the state information of the target tracking vehicle may be determined more accurately, and the target tracking vehicle may be effectively tracked. On the other hand, the predicted value and the detected value of the state information of the target tracking vehicle are fused through the sequential Kalman filtering model, thereby effectively avoiding the phenomenon of tracking data delay caused by the asynchronous transmission of synchronous information, effectively ensuring the timeliness of the determined tracking value of the state information of the target tracking vehicle and further improving the accuracy of vehicle tracking.

Other features and advantages of the present disclosure will be described in detail in the following detailed description.

BRIEF DESCRIPTION OF THE DRAWINGS

The drawings are used for providing a further understanding of the present disclosure and constitute a part of the specification. The drawings, together with the following specific embodiments, are used for explaining the present disclosure, but are not intended to limit the present disclosure. In the drawings.

DETAILED DESCRIPTION

Figure 1:
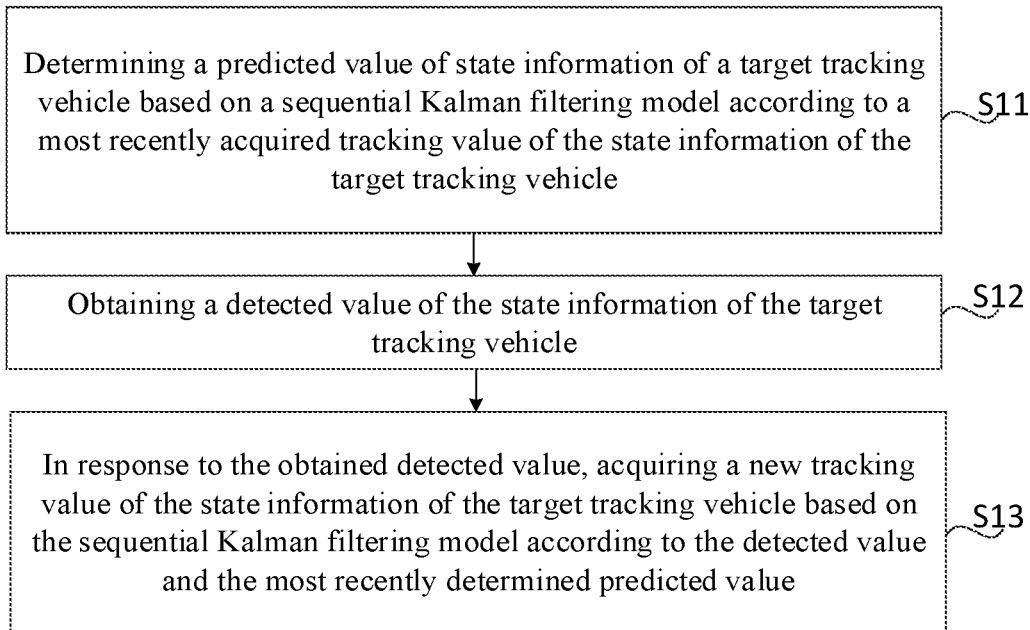
FIG. 1 is a flow chart of a vehicle tracking method provided according to one embodiment of the present disclosure.

The specific embodiments of the present disclosure will be described in detail below in combination with the drawings. It should be understood that the specific embodiments described herein are merely used for illustrating and explaining the present disclosure, rather than limiting the present disclosure.

In order that those skilled in the art may understand the technical solutions provided by the embodiments of the present invention more easily, related arts involved are briefly introduced below at first.

First, a Kalman filtering model is introduced. In the present disclosure, when a tracking vehicle is tracked by using the Kalman filtering model, a motion model of the tracking vehicle adopts a constant velocity (CV) model, and a state vector thereof is exemplarily expressed as follows:

$$X(k)=[p_x(k),p_y(k),v_x(k),v_y(k)]^T \qquad (1)$$

wherein X(k) represents state information of the tracking vehicle, $p_x(k)$ and $p_y(k)$ represent the location of the vehicle, $v_x(k)$ and $v_y(k)$ represent the speed of the vehicle in a local NE (North East) coordinate, wherein x and y represent the north orientation and the east orientation respectively. The CV model is a standard kinetic model, and the motion model of the tracking vehicle may be expressed as:

$$X(k)=FX(k-1)+V(k) \qquad (2)$$

wherein a state model matrix F is expressed as:

$$F = \begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix} \qquad (3)$$

$\Delta t$ represents the time elapsed since the most recently update of the Kalman filtering model;

V(k) represents noise and is used for characterizing the uncertainty of detection system evolution, and may be expressed as:

$$V(k) = \begin{bmatrix} \frac{a_x \Delta t^2}{2} & \frac{a_y \Delta t^2}{2} & a_x \Delta t & a_y \Delta t \end{bmatrix}^T \qquad (4)$$

wherein $a_x$ and $a_y$ represent acceleration components of x and y directions in a coordinate system respectively, wherein $a_x$ and $a_y$ represent independent Gaussian random variables, an average value thereof is 0, and variances are respectively $\sigma_{ax}^2$ and $\sigma_{ay}^2$, wherein the values of the variances $\sigma_{ax}^2$ and $\sigma_{ay}^2$ are determined by the motion model of the vehicle. V(k) also represents a Gaussian random variable, the average value of V(k) is 0, the change of V(k) is given through Q, and Q is expressed as follows:

$$Q = \begin{bmatrix} \frac{\sigma_{ax}^2 \Delta t^4}{4} & 0 & \frac{\sigma_{ax}^2 \Delta t^3}{2} & 0 \\ 0 & \frac{\sigma_{ay}^2 \Delta t^4}{4} & 0 & \frac{\sigma_{ay}^2 \Delta t^3}{2} \\ \frac{\sigma_{ax}^2 \Delta t^3}{2} & 0 & \sigma_{ax}^2 \Delta t^2 & 0 \\ 0 & \frac{\sigma_{ay}^2 \Delta t^3}{2} & 0 & \sigma_{ay}^2 \Delta t^2 \end{bmatrix} \qquad (5)$$

The Kalman filtering model is introduced above, and the specific embodiments of the present disclosure will be described in detail below in combination with the Kalman filtering model.

As shown in FIG. 1, it is a flow chart of a vehicle tracking method provided according to one embodiment of the present disclosure. As shown in FIG. 1, the method includes:

In S11, a predicted value of state information of a target tracking vehicle is determined based on a sequential Kalman filtering model according to a most recently acquired tracking value of the state information of the target tracking vehicle, wherein the state information at least includes location information.

Exemplarily, the predicted value of the current state information of the target tracking vehicle may be determined according to the most recently acquired tracking value of the state information of the target tracking vehicle via the above formula (2). The state information at least includes the location information, that is, the state information may be represented by $p_x(k)$ and $p_y(k)$ described above.

Optionally, the sequential Kalman filtering model may be used for performing prediction after a certain time length, exemplarily, the sequential Kalman filtering model may be used for performing prediction every 10 ms to acquire a predicted value of the state information of the target tracking vehicle.

In S12, a detected value of the state information of the target tracking vehicle is obtained. The detected value of the state information of the target tracking vehicle is the state information of the target tracking vehicle determined by detecting in real time.

In S13, in response to the obtained detected value, a new tracking value of the state information of the target tracking vehicle is acquired based on the sequential Kalman filtering model according to the detected value and the most recently determined predicted value.

The detected value is used for representing the current state information of the target tracking vehicle determined by detecting in real time, the predicted value is used for representing the current state information determined based on a historical trajectory of the target tracking vehicle, by fusing the detected value with the predicted value, when the tracking value of the state information of the target tracking vehicle is determined, reference is not only made on the real-time detected value of the target tracking vehicle, but also is made on the predicted value determined by the historical trajectory of the target tracking vehicle, so that the tracking value of the state information of the target tracking vehicle may be determined more accurately.

The new tracking value of the state information of the target tracking vehicle is determined by using the sequential Kalman filtering in the present disclosure. The sequential Kalman filtering model may perform filtering by using a sequential update method, that is, the acquired detected value of each piece of state information is regarded as an independent detected value, and the filtering is performed according to the order of the obtained detected values.

In the above technical solution, on the basis of the most recently acquired tracking value of the state information of the target tracking vehicle, when the detected value of the state information of the target tracking vehicle is acquired, the predicted value and the detected value of the state information of the target tracking vehicle are fused based on the sequential Kalman filtering model, so as to determine the new tracking value of the target tracking vehicle. Therefore, through the above technical solution, on one hand, the tracking value of the state information of the target tracking vehicle may be determined more accurately, and the target tracking vehicle may be effectively tracked. On the other hand, the predicted value and the detected value of the state information of the target tracking vehicle are fused through the sequential Kalman filtering model, thereby effectively avoiding the phenomenon of tracking data delay caused by the asynchronous transmission of synchronous information, effectively ensuring the timeliness of the determined tracking value of the state information of the target tracking vehicle and further improving the accuracy of vehicle tracking.

In order to make those skilled in the art more understand the technical solutions provided by the embodiments of the present invention, the above steps are described in detail below.

Optionally, in S12, the obtaining the detected value of the state information of the target tracking vehicle may include:

receiving communication information sent by the target tracking vehicle that communicates with a present vehicle, wherein the communication information includes the detected value of the state information of the target tracking vehicle.

Exemplarily, the state information may include location information and speed information. The vehicles are provided with Global Navigation Satellite System (GNSS) receivers. Through the GNSS receiver, the target tracking vehicle may determine the location information and the speed information thereof, and thus may send the location information and the speed information to the present vehicle. Exemplarily, the location information and the speed information may be sent to the present vehicle in the form of a standard V2V Basic Safe Message (BSM). Then, the present vehicle may parse the basic safe message to acquire the location information and the speed information of the target tracking vehicle. Optionally, the present vehicle may also determine a relative position and a relative speed of the two vehicles based on the location information and the speed information of the present vehicle and the target tracking vehicle. Optionally, the target tracking vehicle may send the communication information to the present vehicle at a predetermined time interval, and may also send the communication information to the present vehicle from time to time, which is not limited in the present disclosure.

Optionally, for the detected value of the state information of the target tracking vehicle determined through the communication information sent by the target tracking vehicle, in an exemplary embodiment of the present disclosure, the vectorized representation corresponding to the detected value is as follows:

$$Z_v(k)=[z_{v,px}(k) z_{v,py}(k) z_{v,vx}(k) z_{v,vy}(k)]^T \quad (6)$$

wherein $Z_v(k)$ represents the detected value of the state information of the target tracking vehicle determined through the communication information sent by the target tracking vehicle, $z_{v,px}(k)$ and $z_{v,py}(k)$ respectively represent components of the detected value of the location information of the target tracking vehicle determined through the communication information sent by the target tracking vehicle on the x axis and the y axis, and $z_{v,vx}(k)$ and $z_{v,vy}(k)$ respectively represent components of the detected value of the speed information of the target tracking vehicle determined through the communication information sent by the target tracking vehicle on the x axis and the y axis.

In the present embodiment, an observation model (denoted as a first observation model) of the target tracking vehicle is shown as follows:

$$Z_v(k)=H_v X(k)+w_v(k) \quad (7)$$

wherein $H_v$ represents a first observation matrix, which is specifically expressed as follows:

$$H_v = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (8)$$

$w_v(k)$ represents the measurement noise of the first observation model, the average value of $w_v(k)$ is 0, and the change of $w_v(k)$ is given through , which is set to be constant with time and is expressed as follows:

$$R_v = \begin{bmatrix} \sigma_{v,px}^2 & 0 & 0 & 0 \\ 0 & \sigma_{v,py}^2 & 0 & 0 \\ 0 & 0 & \sigma_{v,vx}^2 & 0 \\ 0 & 0 & 0 & \sigma_{v,vy}^2 \end{bmatrix} \quad (9)$$

Therefore, through the above technical solution, when the detected value of the state information of the target tracking vehicle determined according to the communication information sent by the target tracking vehicle is obtained, the detected value may be processed according to the observation model corresponding to the detected value, therefore the accuracy of the sequential Kalman filtering model to determine the new tracking value of the state information may be effectively ensured.

Optionally, in S12, the obtaining the detected value of the state information of the target tracking vehicle may include:

determining the detected value of the state information of the target tracking vehicle according to an image shot by a camera sensor arranged on the present vehicle.

Exemplarily, the number of the camera sensor is multiple, that is, a plurality of camera sensors may be arranged on the present vehicle, the number of the camera sensors may be set according to the shooting range of the camera sensors, so that the plurality of camera sensors may shoot images within a 360-degrees angle range around the present vehicle.

Exemplarily, after the camera sensor shoots the image, image identification may be performed on the image, and then feature extraction is performed to determine the detected value of the state information of the target tracking vehicle, and the state information may the location information of the target tracking vehicle. Exemplarily, the vehicles in the image may be detected by a Convolutional Neural Networks (CNN) algorithm to determine the detected value of the location information of each vehicle. For example, the detected value of the location information of the vehicle may be determined in a camera projection manner. The detecting the image and determining the location information of the vehicle in the image via the CNN algorithm are all prior art, and thus are not repeated redundantly herein.

Optionally, for the detected value of the state information of the target tracking vehicle determined according to the image shot by the camera sensor arranged on the present vehicle, in an exemplary embodiment of the present disclosure, the vectorized representation corresponding to the detected value is as follows:

$$Z_c(k)=[z_{c,px}(k) z_{c,py}(k)]^T \quad (10)$$

wherein $Z_c(k)$ represents the detected value of the state information of the target tracking vehicle determined according to the image shot by the camera sensor arranged on the present vehicle, and $z_{c,px}(k)$ and $z_{c,py}(k)$ respectively represent components of the detected value of the location information of the target tracking vehicle determined according to the image shot by the camera sensor arranged on the present vehicle on the x axis and the y axis.

In the present embodiment, the observation model (denoted as a second observation model) of the target tracking vehicle is shown as follows:

$$Z_c(k) = H_c X(k) + w_c(k) \quad (11)$$

wherein $H_c$ represents a second observation matrix, which is specifically expressed as follows:

$$H_c = \begin{bmatrix} 1 & 0 & 0 & 0 \\ 0 & 1 & 0 & 0 \end{bmatrix} \quad (12)$$

$w_c(k)$ represents the measurement noise of the second observation model, the average value of $w_c(k)$ is 0, and the change of $w_c(k)$ is given through $R_c$, which is set to be constant with time and is expressed as follows:

$$R_c = \begin{bmatrix} \sigma_{c,x}^2 & 0 \\ 0 & \sigma_{c,y}^2 \end{bmatrix} \quad (13)$$

Therefore, through the above technical solution, when the detected value of the state information of the target tracking vehicle determined according to the image shot by the camera sensor arranged on the present vehicle is obtained, the detected value may be processed according to the observation model corresponding to the detected value, therefore the accuracy of the sequential Kalman filtering model to determine the new tracking value of the state information may be effectively ensured.

It should be noted that the detected value of the state information of the target tracking vehicle in the present disclosure may simultaneously include the detected value determined based on the communication information and the detected value determined based on the image shot by the camera sensor. In the present embodiment, it is necessary to ensure that a geographic coordinate system corresponding to the detected value determined based on the communication information is consistent with the geographic coordinate system corresponding to the detected value determined based on the image shot by the camera sensor. Therefore, when the coordinate systems corresponding to the two detected values are inconsistent, for example, the geographic coordinate system corresponding to the detected value determined based on the communication information is a World Geodetic System 84 (WGS 84) coordinate system, and the geographic coordinate system corresponding to the detected value determined based on the image shot by the camera sensor is a North East Down (NED), then geographic coordinate systems may be converted into a consistent coordinate system by a coordinate system conversion algorithm. The coordinate system conversion algorithm is the prior art, and thus is not repeated redundantly herein.

When the sequential Kalman filtering model is used for calculation, the detection information determined by the above two manners may be separately processed by using the corresponding observation models. If the detected value is determined according to the image shot by the camera sensor arranged on the present vehicle, the detected value may be processed by the sequential Kalman filtering model according to the above formula (11); and when the detected value is determined according to the communication information sent by the target tracking vehicle that communicates with the present vehicle, the detected value may be processed by the sequential Kalman filtering model according to the above formula (7).

Optionally, the method further includes:
respectively determining a first estimation difference between the new tracking value and the detected value, and a second estimation difference between the new tracking value and the most recently determined predicted value; and
determining a gain matrix of the sequential Kalman filtering model according to the first estimation difference and the second estimation difference so as to update the sequential Kalman filtering model.

The first estimation difference is the difference between the new tracking value and the detected value, and the second estimation difference is the difference between the new tracking value and the most recently determined predicted value. The gain matrix is used for representing weights corresponding to the detected value and the predicted value of the state information, when the new tracking value is determined. The calculation manner of the gain matrix is the prior art, and thus is not repeated redundantly herein.

Through the above technical solution, after the tracking value of the state information of the target tracking vehicle is determined every time, the gain matrix of the sequential Kalman filtering model is calculated, so that the sequential Kalman filtering model may be updated in real time, the prediction accuracy of the sequential Kalman filtering model may be effectively improved, and the accuracy of vehicle tracking may be improved.

Optionally, the method further includes:
determining an estimation difference between the detected value of the state information of the target tracking vehicle and the most recently determined predicted value of the state information of the target tracking vehicle, wherein the formula is as follows:

$$v(k) = Z(k) - H\hat{X}(k/k-1) \quad (14)$$

wherein $v(k)$ represents the estimation difference, $Z(k)$ represents the detected value, and H represents an observation matrix of the observation model corresponding to the detected value. The observation models and the observation matrices corresponding to the $Z(k)$ and H may be determined according to the source of the detected value. $\hat{X}(k/k-1)$ represents the most recently determined predicted value of the state information of the target tracking vehicle.

The average value of the estimation difference is 0, and the variance of which is as follows:

$$S(k) = E\{v(k)v^T(k)\} = HP(k/k-1)H + R \quad (15)$$

wherein R represents the measurement noise, and $P(k/k-1)$ is a variance matrix of $\hat{X}(k/k-1)$.

By using the estimation difference, the degree of deviation between a first sequence formed by the predicted value of the sequential Kalman filtering model and a second sequence formed by the detected value of the corresponding state information may be characterized, so that the prediction accuracy of the sequential Kalman filtering model may be evaluated according to the estimation difference.

Figure 2:
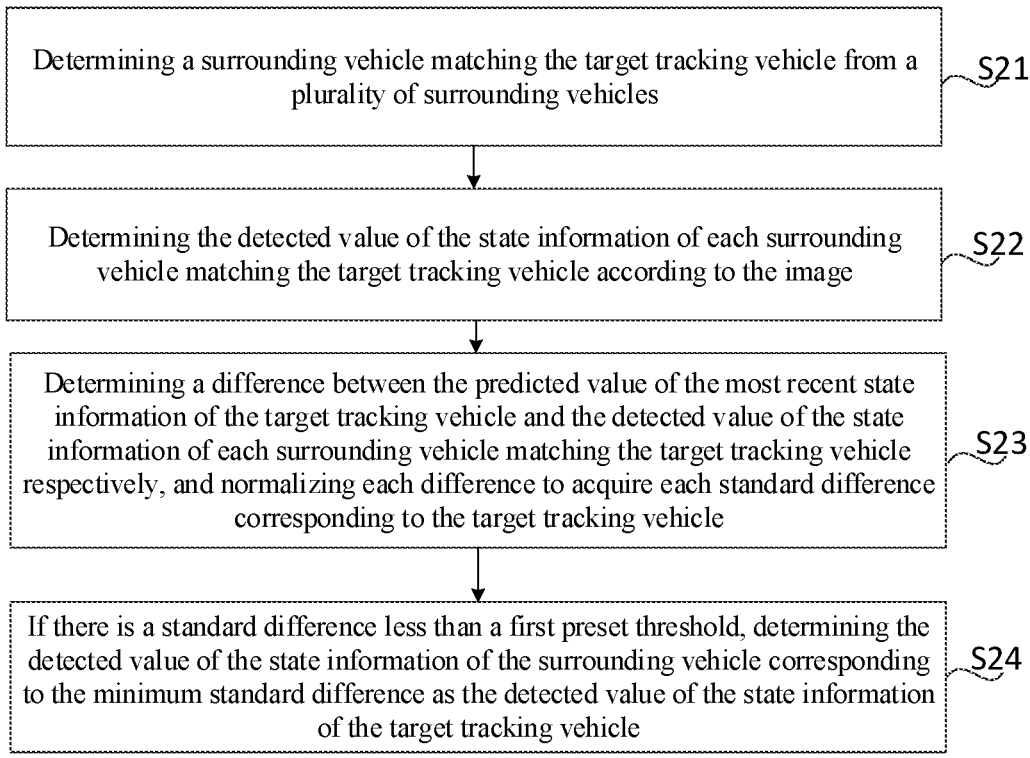
FIG. 2 is a flow chart of an exemplary embodiment of determining a detected value of state information of a target tracking vehicle according to an image shot by a camera sensor arranged on a present vehicle.

Optionally, the image includes image information of a plurality of surrounding vehicles;
an exemplary embodiment of determining the detected value of the state information of the target tracking vehicle according to the image shot by the camera sensor arranged on the present vehicle is as follows, as shown in FIG. 2, including:

In S21, a surrounding vehicle matching the target tracking vehicle is determined from the plurality of surrounding vehicles, wherein the surrounding vehicle matching the target tracking vehicle is a surrounding vehicle that is consistent with the vehicle type information of the target tracking vehicle, and the vehicle type information at least includes a vehicle color or a vehicle model.

Exemplarily, when vehicle information is extracted from the image shot by the camera sensor, the vehicle information may include the vehicle color or the vehicle model number of the vehicle. Exemplarily, if the extracted vehicle information includes the vehicle color, then the vehicle color of each vehicle in the shot image may be matched with the vehicle color of the target tracking vehicle, and the vehicle having the vehicle color consistent with the vehicle color of the target tracking vehicle in the shot image is determined as the surrounding vehicle matching the target tracking vehicle.

In S22, the detected value of the state information of each surrounding vehicle matching the target tracking vehicle is determined according to the image.

When the surrounding vehicle matching the target tracking vehicle is determined, the detected value of the state information corresponding to the surrounding vehicle matching the target tracking vehicle may be determined based on the image. The manner of determining the detected value according to the image has been described above, and thus is not repeated redundantly herein.

In S23, the difference between the predicted value of the most recent state information of the target tracking vehicle and the detected value of the state information of each surrounding vehicle matching the target tracking vehicle is respectively determined, and each difference is normalized to obtain each standard difference corresponding to the target tracking vehicle.

The difference between the predicted value of the most recent state information of the target tracking vehicle and the detected value of the state information of any surrounding vehicle matching the target tracking vehicle may be calculated through the above formula (14), and each difference is normalized through the following formula:

$$d_i^2(k) = v_i^T(k) S_i^{-1}(k) v_i(k) \tag{16}$$

wherein $d_i^2(k)$ represents the standard difference corresponding to the predicted value of the most recent state information of the target tracking vehicle and the detected value of the state information of the ith surrounding vehicle matching the target tracking vehicle;

$v_i(k)$ represents the estimation difference corresponding to the predicted value of the most recent state information of the target tracking vehicle and the detected value of the state information of the ith surrounding vehicle matching the target tracking vehicle; and $S_i(k)$ represents the variance of the estimation difference corresponding to the predicted value of the most recent state information of the target tracking vehicle and the detected value of the state information of the ith surrounding vehicle matching the target tracking vehicle.

In S24, if there is a standard difference less than a first preset threshold, the detected value of the state information of the surrounding vehicle corresponding to the minimum standard difference is determined as the detected value of the state information of the target tracking vehicle.

The first preset threshold may be set according to an actual use scenario. If the standard difference is less than the first preset threshold, it indicates that the detected value of the state information of the surrounding vehicle is similar to the predicted value of the state information of the target tracking vehicle, therefore, the surrounding vehicle closest to the target tracking vehicle in the shot image may be determined as the target tracking vehicle, and thus the detected value of the state information of the surrounding vehicle corresponding to the minimum standard difference is determined as the detected value of the state information of the target tracking vehicle.

Through the above technical solution, the vehicle in the image shot by the camera sensor may be associated with the target tracking vehicle, so that the predicted value of the state information of the target tracking vehicle may be corrected, accordingly, the accuracy of the state information of the target tracking vehicle may be improved, and the accuracy of vehicle tracking may be improved.

Optionally, the method further includes:
if there is a standard difference less than the first preset threshold, associating the surrounding vehicle corresponding to the minimum standard difference with the target tracking vehicle, wherein the target tracking vehicle is one of tracking vehicles recorded in a tracking vehicle list of the present vehicle.

After the detected value of the state information of the target tracking vehicle is determined above, the surrounding vehicle corresponding to the minimum standard difference may be associated with the target tracking vehicle, thereby determining a corresponding relationship between the vehicles in the shot image and the vehicles in the tracking vehicle list. By means of the above manner, the detected values of the state information of the other tracking vehicles in the tracking vehicle list may also be determined, so that the corresponding relationships between the respective vehicles in the shot image and the vehicles in the tracking vehicle list of the present vehicle may be determined, and then the vehicles in the tracking vehicle list may be conveniently managed.

Exemplarily, if the detected value is determined through the communication information sent by the target tracking vehicle, since the communication information has a unique Service Set Identifier (SSID), the detected value and the vehicles in the tracking vehicle list may be associated based on the service set identifier. If the service set identifier associated with the detected value is ID1, the detected value may be determined as the detected value of the vehicle whose service set identifier is ID1 in the tracking vehicle list.

Optionally, the method further includes:
if consecutive N images shot by the same camera sensor contain the image information of the same surrounding vehicle, and the surrounding vehicle is not associated with any tracking vehicle in the tracking vehicle list, adding the surrounding vehicle to the tracking vehicle list, wherein N is a positive integer, and N>1.

The shooting range of each camera sensor is different, therefore, the corresponding target tracking vehicle is generally different. For the same camera sensor, the corresponding tracking vehicles are generally the same group of vehicles. Optionally, in the present embodiment, when the surrounding vehicle is associated with the target tracking vehicle, the image information corresponding to the surrounding vehicle may be marked with an association identifier. Exemplarily, the association identifier may be an ID of the vehicle in the tracking list corresponding to the surrounding vehicle.

For the vehicle that is not associated with any tracking vehicle in the tracking vehicle list in the currently shot image, if the currently shot image is the first frame image shot by the camera sensor, the number of occurrences of the surrounding vehicle is directly recorded, and the initial value is 1.

If the currently shot image is not the first frame image shot by the camera sensor, then the image information of the surrounding vehicle (referred to as A for the convenience of explanation) that is not associated with any tracking vehicle in the tracking vehicle list in the currently shot image is compared with the previously shot image of the camera sensor to determine whether the surrounding vehicle A exists in the previously shot image. If it is determined by comparison that the surrounding vehicle A does not exist in the previously shot image, the number of occurrences of the surrounding vehicle is directly recorded, and the initial value is 1.

If it is determined by comparison that the surrounding vehicle A exists in the previously shot image, whether the image information corresponding to the surrounding vehicle A is marked with an association identifier in the previously shot image, and if the association identifier is not marked, 1 is added to the number of occurrences of the surrounding vehicle A; and if the association identifier is marked, the number of occurrences of the surrounding vehicle A is recorded, and the initial value is 1.

Exemplarily, N may be set according to the actual use scenario, for example, set as 3. Then, if the same surrounding vehicle occurs in the image shot by the same camera sensor for three consecutive times, and the surrounding vehicle is not marked with the association identifier, it may be indicated that the surrounding vehicle is a vehicle newly entering the shooting range of the camera sensor, and the occurrence frequency of the vehicle is stable, therefore, the vehicle may be added to the tracking vehicle list of the present vehicle so as to track the vehicle subsequently.

Optionally, when the present vehicle receives the communication information sent by a communication vehicle and the communication information carries the detected value of the state information of the communication vehicle, if the vehicle is not in the tracking vehicle list of the present vehicle, the communication vehicle is directly added to the tracking vehicle list of the present vehicle so as to track the vehicle subsequently, and the vehicles needing to be tracked by the present vehicle are further completed to ensure the comprehensiveness of vehicle tracking.

Optionally, in an embodiment, when the obtained detected value of the state information of the target tracking vehicle indicates that the target tracking vehicle is beyond the tracking range of the present vehicle, if the detected value is determined through the communication information sent by the target tracking vehicle, the target tracking vehicle is directly removed from the vehicle list, if the detected value is determined through the image shot by the camera sensor of the present vehicle, and if the detected value indicates that the target tracking vehicle is beyond the tracking range of the present vehicle for continuous M times (wherein M is an integer, greater than 1) in the image shot by the camera sensor, the target tracking vehicle is removed from the tracking vehicle list of the present vehicle.

In another embodiment, if the detected value of the state information of the target tracking vehicle is not received within a certain time length, the target tracking vehicle is removed from the tracking vehicle list of the present vehicle. Thereby, the tracking vehicle list of the present vehicle may be managed in real time and accurately, the waste of resources caused by tracking the vehicles that do not need to be tracked is avoided, and the amount of data processing is reduced.

Optionally, the method further includes:
if the number of times that the continuously obtained detected values of the state information of the target tracking vehicle are invalid exceeds a second preset threshold, performing an alarm to prompt that the camera sensor for generating the detected values is abnormal, or the communication with the target tracking vehicle is abnormal.

When the detected value of the state information of the target tracking vehicle is within an abnormal range, and the same detected value occurs continuously, or all or a part of obtained images generate blank screen, or the difference between the time corresponding to the detected value and the current time exceeds a threshold, the corresponding detected value is determined to be invalid. Exemplarily, the second preset threshold may be set based on the actual use scenario. In the present embodiment, the corresponding prompt information may be determined according to the source of the detected value of the state information of the target tracking vehicle. If the detected value is determined through the communication information, then the abnormality of the communication with the target tracking vehicle may be prompted, if the detected value is determined through the image shot by the camera sensor, the abnormality of the camera sensor for generating the detected value may be prompted, therefore, a user may conveniently know the detection of the abnormality in time and determine corresponding countermeasures, as a result, the user experience is improved.

Optionally, the method further includes:
caching the detected values of the state information of the target tracking vehicle obtained within the most recently preset time length, wherein each detected value is associated with a corresponding detection time.

Exemplarily, if the detected value of the state information is determined through the communication information sent by the target tracking vehicle, the detection time corresponding to the detected value may be the time when the target tracking vehicle determines the detected value of the state information or the time of sending the communication information; and if the detected value of the state information is determined through the image shot by the camera sensor of the present vehicle, the detection time corresponding to the detected value may be the shooting time of the image.

In order to ensure the consistency of the times corresponding to different detected values, when the time is determined, the target tracking vehicle and the present vehicle may simultaneously adopt a time stamp provided in a Global Positioning System (GPS), and the time consistency is ensured based on a public satellite in the GPS.

If the detection time corresponding to the currently obtained detected value of the state information of the target tracking vehicle is later than the detection time corresponding to the previously obtained detected value of the state information of the target tracking vehicle, the step of in response to the obtained detected value, acquiring the new tracking value of the state information of the target tracking vehicle based on the sequential Kalman filtering model according to the detected value and the most recently determined predicted value is executed.

If the detection time corresponding to the currently obtained detected value of the state information of the target tracking vehicle is later than the detection time corresponding to the previously obtained detected value of the state information of the target tracking vehicle, it indicates that the acquisition of the detected values is sequential, then at this time, the step 13 may be directly executed to determine the new tracking value of the state information.

Through the above technical solution, whether the detected values are sequential is determined according to the detection times corresponding to the detected values, and only when the detected values are sequentially received, the state information of the target tracking vehicle is tracked based on the detected value and the most recently determined predicted value, therefore the influence of the disordered reception of the detected values on the tracking result may be effectively avoided, and the accuracy of vehicle tracking may be ensured.

Optionally, the method further includes:

if the detection time corresponding to the currently obtained detected value of the state information of the target tracking vehicle is not later than the detection time corresponding to the previously obtained detected value of the state information of the target tracking vehicle, acquiring the new tracking value of the state information of the target tracking vehicle based on the sequential Kalman filtering model according to the detected values of the state information of the target tracking vehicle obtained within the most recently preset time length and the most recently determined predicted value, or, determining the new tracking value of the state information of the target tracking vehicle through a forward-prediction fusion and decorrelation algorithm.

If the detection time corresponding to the currently obtained detected value of the state information of the target tracking vehicle is not later than the detection time corresponding to the previously obtained detected value of the state information of the target tracking vehicle, it may be caused by the transmission of the communication information, or the disordered reception of the detection information caused by a fault of the camera sensor or the like, at this time, when the target tracking vehicle is directly tracked according to the currently obtained detected value, since the detected value corresponds to the previous state information of the target tracking vehicle, the tracking value of the state information is deviated.

Therefore, in an exemplary embodiment of the present disclosure, a comprehensive detected value may be determined according to the detected values of the state information of the target tracking vehicle obtained within the most recently preset time length, and the new tracking value is determined according to the comprehensive detected value and the most recently determined predicted value, thereby effectively reducing the influence of the disordered detected values on the vehicle tracking result.

In another embodiment of the present disclosure, the new tracking value of state information of the target tracking vehicle is determined by the forward-prediction fusion and decorrelation (FPFD) algorithm, wherein the forward-prediction fusion and decorrelation FPFD algorithm is the prior art, and thus is not repeated redundantly herein.

Therefore, through the above technical solution, when the obtained detected values are disordered, the disordered detected values may be processed to effectively reduce the influence of the disordered detected values on the tracking results, and the accuracy of vehicle tracking is ensured.

Optionally, the present disclosure may further include measured values of other sensors, such as a radar, a laser radar, a sonar and the like, the measured values of the sensors are fused by a sequential Kalman filter, the fusion method thereof is as described above, thus is not repeated redundantly herein, therefore the performance and robustness of vehicle tracking may be further improved.

Figure 3:
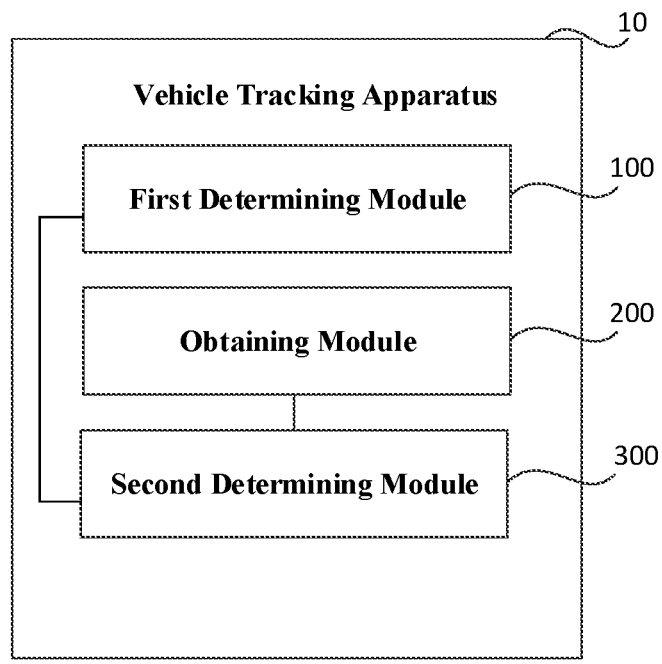
FIG. 3 is a block diagram of a vehicle tracking apparatus provided according to one embodiment of the present disclosure.

The present disclosure further provides a vehicle tracking apparatus, and as shown in FIG. 3, the apparatus 10 includes:

a first determining module 100, configured to determine a predicted value of state information of a target tracking vehicle based on a sequential Kalman filtering model according to a most recently acquired tracking value of the state information of the target tracking vehicle, wherein the state information at least includes location information;

an obtaining module 200, configured to obtain a detected value of the state information of the target tracking vehicle; and a second determining module 300 configured to, in response to the obtained detected value, acquire a new tracking value of the state information of the target tracking vehicle based on the sequential Kalman filtering model according to the detected value and the most recently determined predicted value.

Optionally, the apparatus 10 further includes:

a third determining module, configured to respectively determine a first estimation difference between the new tracking value and the detected value, and a second estimation difference between the new tracking value and the most recently determined predicted value; and a fourth determining module, configured to determine a gain matrix of the sequential Kalman filtering model according to the first estimation difference and the second estimation difference so as to update the sequential Kalman filtering model.

Optionally, the obtaining module 200 includes:

a receiving submodule, configured to receive communication information sent by the target tracking vehicle that communicates with a present vehicle, wherein the communication information includes the detected value of the state information of the target tracking vehicle.

Optionally, the obtaining module 200 includes:

a first determining submodule, configured to determine the detected value of the state information of the target tracking vehicle according to an image shot by a camera sensor arranged on the present vehicle.

Optionally, the image includes image information of a plurality of surrounding vehicles;

the first determining submodule includes:

a second determining submodule, configured to determine a surrounding vehicle matching the target tracking vehicle from the plurality of surrounding vehicles, wherein the surrounding vehicle matching the target tracking vehicle is a surrounding vehicle that is consistent with the vehicle type information of the target tracking vehicle, and the vehicle type information at least includes a vehicle color or a vehicle model number;

a third determining submodule, configured to determine the detected value of the state information of each surrounding vehicle matching the target tracking vehicle according to the image;

a fourth determining submodule, configured to respectively determine a difference between the predicted value of the most recent state information of the target tracking vehicle and the detected value of the state information of each surrounding vehicle matching the target tracking vehicle, and normalize each difference to obtain each standard difference corresponding to the target tracking vehicle; and a fifth determining submodule, configured to: if there is a standard difference less than a first preset threshold, determine the detected value of the state information of the surrounding vehicle corresponding to the minimum standard difference as the detected value of the state information of the target tracking vehicle.

Optionally, the apparatus 10 further includes:

an association module, configured to: if there is a standard difference less than the first preset threshold, associate the surrounding vehicle corresponding to the minimum standard difference with the target tracking vehicle, wherein the target tracking vehicle is one of tracking vehicles recorded in a tracking vehicle list of the present vehicle.

Optionally, the apparatus 10 further includes:

an adding module, configured to: if consecutive N images shot by the same camera sensor contain the image information of the same surrounding vehicle, and the surrounding vehicle is not associated with any tracking vehicle in the tracking vehicle list, add the surrounding vehicle to the tracking vehicle list, wherein N is a positive integer, and N>1.

Optionally, the number of the camera sensor is multiple.

Optionally, the apparatus 10 further includes:

an alarm module, configured to: if the number of times that the continuously obtained detected values of the state information of the target tracking vehicle are invalid exceeds a second preset threshold, perform an alarm to prompt that the camera sensor for generating the detected values is abnormal, or the communication with the target tracking vehicle is abnormal.

Optionally, the apparatus 10 further includes:

a caching module, configured to cache the detected values of the state information of the target tracking vehicle obtained within the most recently preset time length, wherein each detected value is associated with a corresponding detection time; and the second determining module is configured to: if the detection time corresponding to the currently obtained detected value of the state information of the target tracking vehicle is later than the detection time corresponding to the previously obtained detected value of the state information of the target tracking vehicle, execute the step of in response to the obtained detected value, acquiring the new tracking value of the state information of the target tracking vehicle based on the sequential Kalman filtering model according to the detected value and the most recently determined predicted value.

Optionally, the apparatus 10 further includes:

a fifth determining module, configured to: if the detection time corresponding to the currently obtained detected value of the state information of the target tracking vehicle is not later than the detection time corresponding to the previously obtained detected value of the state information of the target tracking vehicle, acquire the new tracking value of the state information of the target tracking vehicle based on the sequential Kalman filtering model according to the detected values of the state information of the target tracking vehicle obtained within the most recently preset time length and the most recently determined predicted value, or, determine the new tracking value of the state information of the target tracking vehicle through a forward-prediction fusion and decorrelation algorithm.

With regard to the apparatus in the above embodiments, the specific manners of the respective modules to perform the operations have been described in detail in the embodiments related to the method, and thus will not be explained in detail herein.

Figure 4:
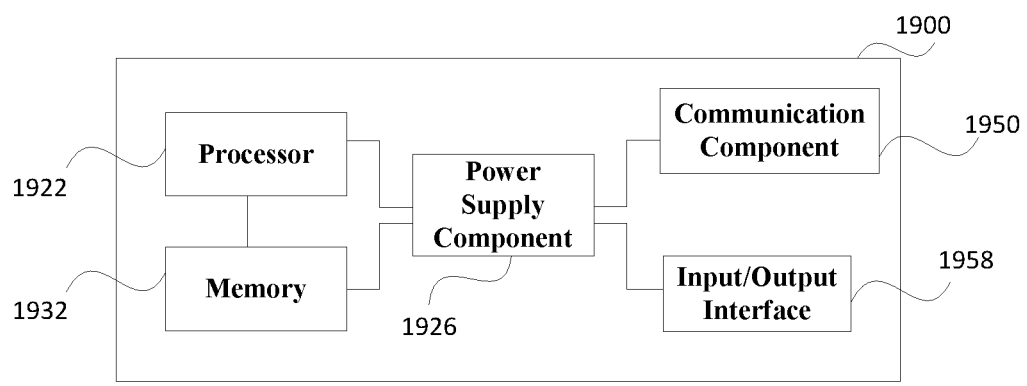
FIG. 4 is a block diagram of an electronic device shown according to an exemplary embodiment.

FIG. 4 is a block diagram of an electronic device 1900 shown according to an exemplary embodiment. For example, the electronic device 1900 may be provided as a server. Referring to FIG. 4, the electronic device 1900 includes a processor 1922, which may be one or more, and a memory 1932, configured to store a computer program executable by processor 1922. The computer program stored in the memory 1932 may include one or more modules, wherein each corresponds to a group of instructions. Additionally, the processor 1922 may be configured to execute the computer program so as to perform the vehicle tracking method described above.

Additionally, the electronic device 1900 may also include a power supply component 1926 and a communication component 1950. The power supply component 1926 may be configured to perform the power supply management of the electronic device 1900, and the communication component 1950 may be configured to implement the communication of electronic device 1900, for example, wired or wireless communication. Additionally, the electronic device 1900 may also include an input/output (I/O) interface 1958. The electronic device 1900 may operate an operating system stored in the memory 1932, such as Windows Server™, Mac OS X™, Unix™, Linux™, and the like.

In another exemplary embodiment, a computer readable storage medium including program instructions is also provided, and the program instructions implement the steps of the vehicle tracking method described above when being executed by the processor. For example, the computer readable storage medium may be the above memory 1932 including program instructions, and the program instructions may be executed by the processor 1922 of the electronic device 1900 to execute the vehicle tracking method described above.

The preferred embodiments of the present disclosure have been described in detail above in combination with the drawings. However, the present disclosure is not limited to the specific details in the above embodiments, various simple modifications may be made to the technical solutions of the present disclosure within the scope of the technical concept of the present disclosure, and these simple modifications all belong to the protection scope of the present disclosure.

It should be additionally noted that, various specific technical features described in the above specific embodiments may be combined in any suitable manner without contradiction. In order to avoid unnecessary repetition, various possible combinations are not additionally illustrated in the present disclosure.

In addition, any combination of various different embodiments of the present disclosure may be made as long as it does not deviate from the spirit of the present disclosure, and it should also be regarded as the contents disclosed by the present disclosure.

What is claimed is:

1. A vehicle tracking method, comprising:
   determining a predicted value of state information of a target tracking vehicle based on a sequential Kalman filtering model according to a most recently acquired tracking value of the state information of the target tracking vehicle, wherein the state information at least comprises location information;

obtaining a detected value of the state information of the target tracking vehicle; and in response to the obtained detected value, acquiring a new tracking value of the state information of the target tracking vehicle based on the sequential Kalman filtering model according to the detected value and the most recently determined predicted value;

wherein the method further comprises:

determining a first estimation difference between the new tracking value and the detected value, and a second estimation difference between the new tracking value and the most recently determined predicted value respectively; and determining a gain matrix of the sequential Kalman filtering model according to the first estimation difference and the second estimation difference so as to update the sequential Kalman filtering model.

2. The method according to claim 1, wherein the obtaining a detected value of the state information of the target tracking vehicle comprises:

receiving communication information sent by the target tracking vehicle that communicates with a present vehicle, wherein the communication information comprises the detected value of the state information of the target tracking vehicle.

3. The method according to claim 1, wherein the obtaining a detected value of the state information of the target tracking vehicle comprises:

determining the detected value of the state information of the target tracking vehicle according to an image shot by a camera sensor arranged on the present vehicle.

4. The method according to claim 3, wherein the image comprises image information of a plurality of surrounding vehicles;

the determining the detected value of the state information of the target tracking vehicle according to an image shot by a camera sensor arranged on the present vehicle comprises:

determining a surrounding vehicle matching the target tracking vehicle from the plurality of surrounding vehicles, wherein the surrounding vehicle matching the target tracking vehicle is a surrounding vehicle that is consistent with the vehicle type information of the target tracking vehicle, and the vehicle type information at least comprises a vehicle color or a vehicle model number;

determining the detected value of the state information of each surrounding vehicle matching the target tracking vehicle according to the image;

determining a difference between the predicted value of the most recent state information of the target tracking vehicle and the detected value of the state information of each surrounding vehicle matching the target tracking vehicle respectively, and normalizing each difference to obtain each standard difference corresponding to the target tracking vehicle; and if there is a standard difference less than a first preset threshold, determining the detected value of the state information of the surrounding vehicle corresponding to the minimum standard difference as the detected value of the state information of the target tracking vehicle.

5. The method according to claim 4, wherein the method further comprises:

if there is a standard difference less than the first preset threshold, associating the surrounding vehicle corresponding to the minimum standard difference with the target tracking vehicle, wherein the target tracking vehicle is one of tracking vehicles recorded in a tracking vehicle list of the present vehicle.

6. The method according to claim 5, wherein the method further comprises:

if consecutive N images shot by the same camera sensor contain the image information of the same surrounding vehicle, and the surrounding vehicle is not associated with any tracking vehicle in the tracking vehicle list, adding the surrounding vehicle to the tracking vehicle list, wherein N is a positive integer, and N>1.

7. The method according to claim 3, wherein the number of the camera sensor is multiple.

8. The method according to claim 1, wherein the method further comprises:

if the number of times that the continuously obtained detected values of the state information of the target tracking vehicle are invalid exceeds a second preset threshold, performing an alarm to prompt that the camera sensor for generating the detected values is abnormal, or the communication with the target tracking vehicle is abnormal.

9. The method according to claim 1, wherein the method further comprises:

caching the detected values of the state information of the target tracking vehicle obtained within the most recently preset time length, wherein each detected value is associated with a corresponding detection time; and if the detection time corresponding to the currently obtained detected value of the state information of the target tracking vehicle is later than the detection time corresponding to the previously obtained detected value of the state information of the target tracking vehicle, executing the step of in response to the obtained detected value, acquiring the new tracking value of the state information of the target tracking vehicle based on the sequential Kalman filtering model according to the detected value and the most recently determined predicted value.

10. The method according to claim 9, wherein the method further comprises:

if the detection time corresponding to the currently obtained detected value of the state information of the target tracking vehicle is not later than the detection time corresponding to the previously obtained detected value of the state information of the target tracking vehicle, acquiring the new tracking value of the state information of the target tracking vehicle based on the sequential Kalman filtering model according to the detected values of the state information of the target tracking vehicle obtained within the most recently preset time length and the most recently determined predicted value, or, determining the new tracking value of the state information of the target tracking vehicle through a forward-prediction fusion and decorrelation algorithm.

11. A non-transitory computer readable storage medium, wherein a computer program is stored thereon, and the computer program implements a vehicle tracking method when being executed by a processor, wherein the method comprises:

determining a predicted value of state information of a target tracking vehicle based on a sequential Kalman filtering model according to a most recently acquired tracking value of the state information of the target tracking vehicle, wherein the state information at least comprises location information;

obtaining a detected value of the state information of the target tracking vehicle; and in response to the obtained detected value, acquiring a new tracking value of the state information of the target tracking vehicle based on the sequential Kalman filtering model according to the detected value and the most recently determined predicted value;

wherein the method further comprises:

determining a first estimation difference between the new tracking value and the detected value, and a second estimation difference between the new tracking value and the most recently determined predicted value respectively; and determining a gain matrix of the sequential Kalman filtering model according to the first estimation difference and the second estimation difference so as to update the sequential Kalman filtering model.

12. An electronic device, comprising:

a memory, wherein a computer program is stored thereon; and a processor, configured to execute the computer program in the memory to implement a vehicle tracking method comprising:

determining a predicted value of state information of a target tracking vehicle based on a sequential Kalman filtering model according to a most recently acquired tracking value of the state information of the target tracking vehicle, wherein the state information at least comprises location information;

obtaining a detected value of the state information of the target tracking vehicle; and in response to the obtained detected value, acquiring a new tracking value of the state information of the target tracking vehicle based on the sequential Kalman filtering model according to the detected value and the most recently determined predicted value;

wherein the method further comprises:

determining a first estimation difference between the new tracking value and the detected value, and a second estimation difference between the new tracking value and the most recently determined predicted value respectively; and determining a gain matrix of the sequential Kalman filtering model according to the first estimation difference and the second estimation difference so as to update the sequential Kalman filtering model.

* * * * *